March 22, 1932. H. SCHNEIDER 1,850,290
LOCOMOTIVE
Filed April 11, 1928 3 Sheets-Sheet 1
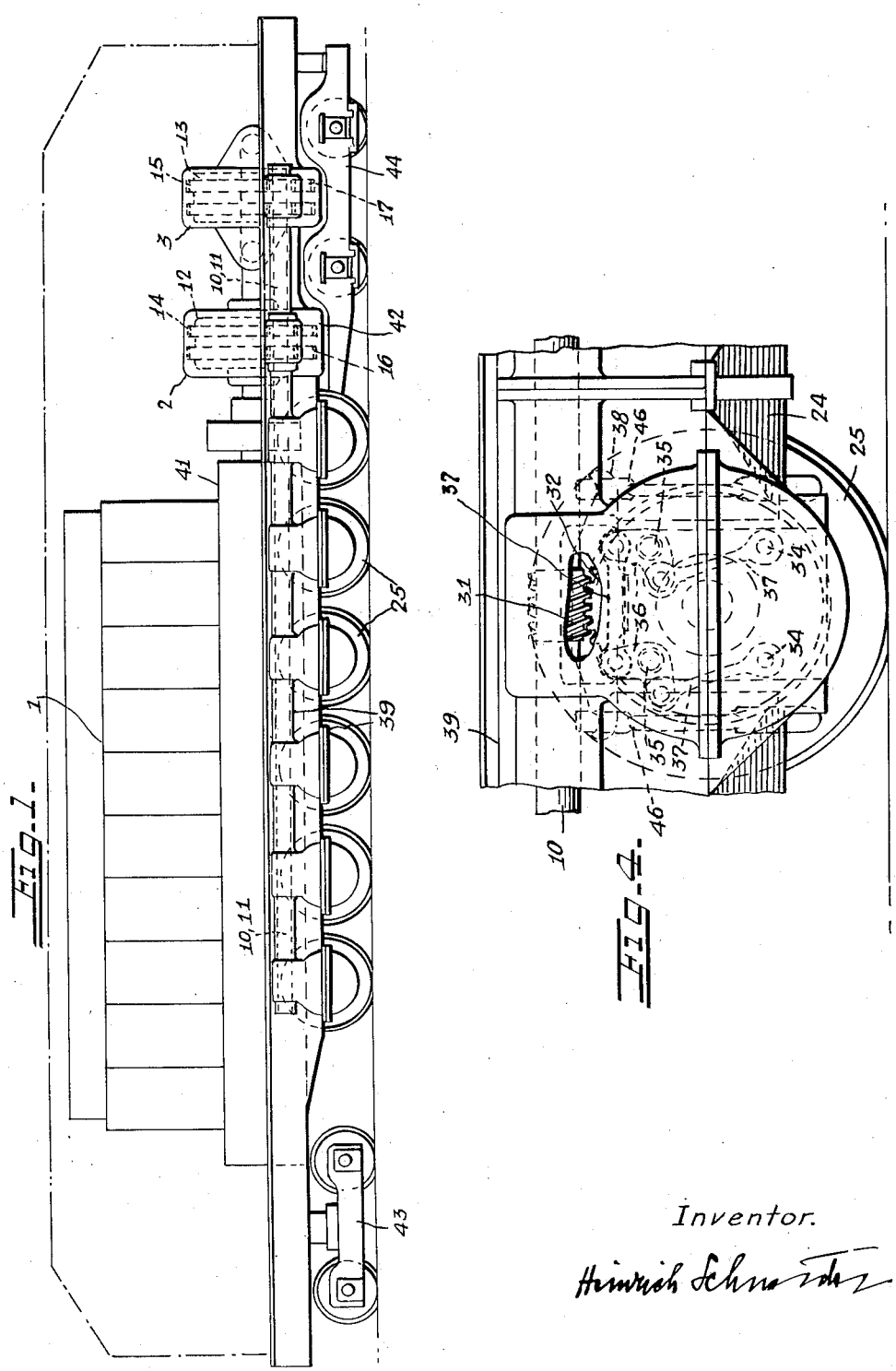
Inventor.
Heinrich Schneider

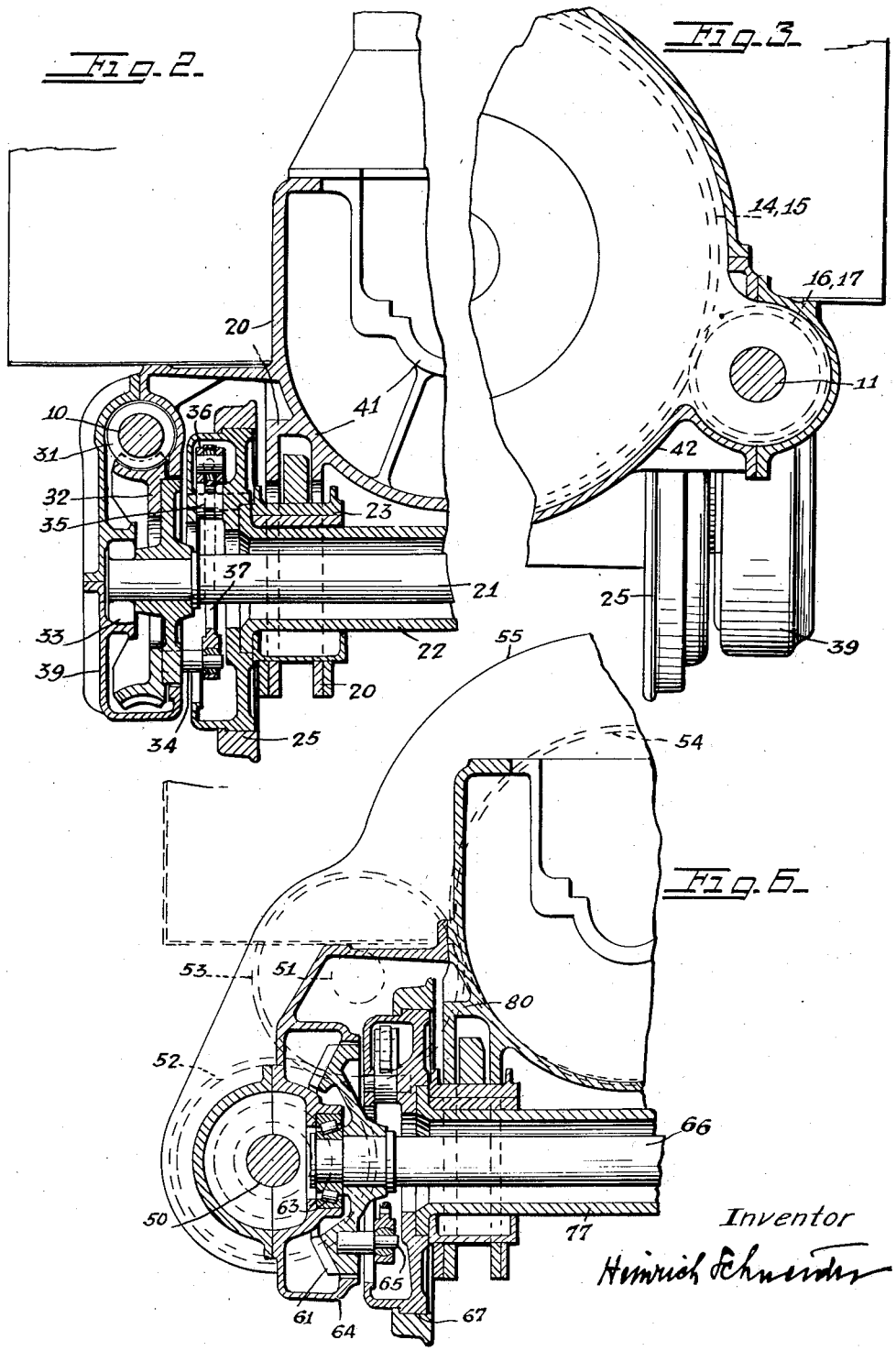

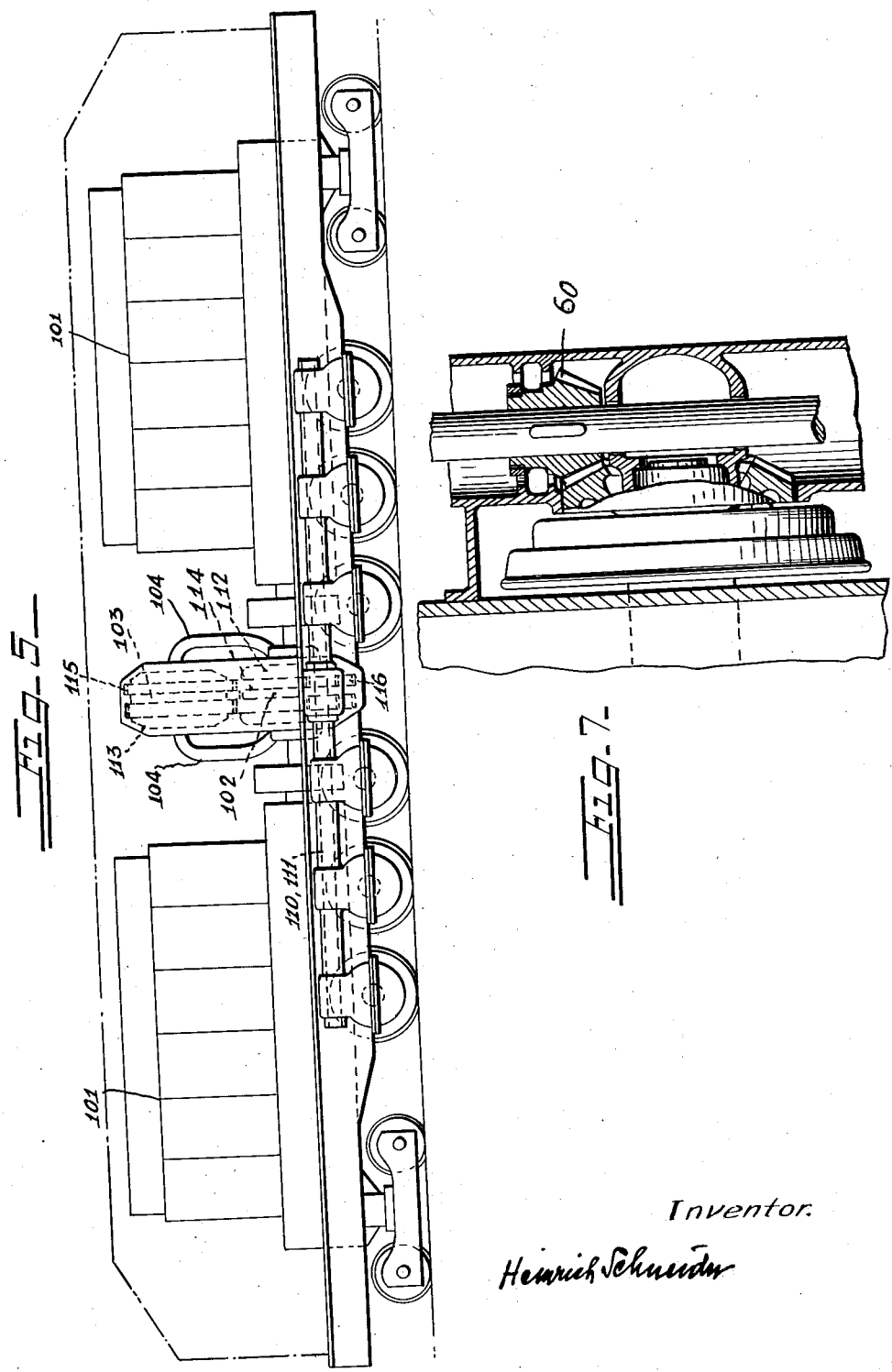

Patented Mar. 22, 1932

1,850,290

UNITED STATES PATENT OFFICE

HEINRICH SCHNEIDER, OF BELOIT, WISCONSIN

LOCOMOTIVE

Application filed April 11, 1928. Serial No. 269,149.

The present invention relates to improvements in locomotives, and has for its object the combination of the prime mover, transmission and driving gear with individual axle drive especially for oil engine driven locomotives of high power, allowing the application of the standard vertical multiple cylinder internal combustion-engine in combination with the simplest design of hydromechanical transmission.

According to the invention, the locomotive is provided with a prime mover, the shaft of which is arranged longitudinally of the locomotive, the prime mover driving a longitudinal countershaft, from which the driving axles are single driven by means of right angle tooth-gears and movable couplings, allowing of radial dislocation of the driving axle.

In oil engine locomotives, preferably, a variable speed transmission is arranged between the oil engine and the countershaft. A special feature of the invention is the application of a hydromechanical transmission between the longitudinal shafts, which transmission comprises a pump and a motor, the rotors of pump and motor being positively connected with each other and with the driven shaft as in my U. S. Patent 1,525,204 and U. S. application 603,670. The shafts of the pump and the motor are arranged parallel to the shaft of the oil engine, and the pump and motor drive the countershaft by means of spur gears, while the crankshaft of the oil engine transmits the power to the pump of the transmission.

Further important features of the invention are: the arrangement of the motor of the transmission upon the pump and symmetrical arrangement of the driving gear and driving axles to the middle of the locomotive and the application of worm gears.

Constructional examples of the object of the present invention are illustrated on the accompanying drawings, in which Fig. 1 shows diagrammatically an elevation of an oil engine driven locomotive.

Fig. 2 is a cross section of the single axle drive of the locomotive and the lower part of the oil engine.

Fig. 3 is a section of the countershaft and spur gears.

Fig. 4 is an elevatonal view of the single axle drive with worm gear coupling.

Fig. 5 shows an elevation of a second constructional example.

Figs. 6 and 7 show a vertical and horizontal part sectional view of a bevel gear single axle drive.

In the constructional example illustrated in Figs. 1–4 the locomotive is driven by a multiple cylinder oil engine 1, the crankshaft of which is arranged in the longitudinal direction of the locomotive.

The shafts of the pump 2 and motor 3 of the hydromechanical transmission are arranged on the axis of the oil engine and the rotors 12 and 13 of both parts of the transmission have toothed rims 14 and 15 meshing with gear wheels 16 and 17 provided on the longitudinal shafts 10 and 11 which extend over the said driving axles.

The oil engine, the transmission and the bearings of the counter shafts are rigidly connected to the locomotive frame. The longitudinal shafts 10 and 11 transmit the power to the tubular axles 22 by means of single drive devices shown in Figs. 2 and 4 consisting of worm 31 and worm wheel 32 and movable rod gear couplings, the latter arranged between said worm wheel 32 and the driving wheel 25 of an axle 22. The hollow axles 22, have the wheels 25, mounted in bearings 23 on which, by means of equalizer 38 and hanger 46 the locomotive frame 20 is resiliently supported by springs 24 as shown in Fig. 4. Inside of the hollow axle and co-axial with it, is the worm wheel carrying shaft 21, mounted in outside bearings 33 rigidly connected to the frame 20. The two co-axial shafts 21 and 22 (the first rigidly connected to worm wheel 32 and the latter rotatably mounted on said shaft, and connected to the driving wheel 25) are coupled together by means of a movable universal coupling, comprising two pins 34 pinned to the worm wheel 32 and two pins 35 pinned to the driving wheel 25, the latter pins carrying the bell crank levers 36 which are connected together and with pins 34 by means of three links 37, as indicated in dotted lines in Fig. 4. The movable coupling allows radial and small axial displacement of the hollow shaft.

From worm wheel 32 the power is transmitted to wheel 25 by pins 34, links 37, bell crank levers 36, and pins 35. Any radial displacement of wheel 25 results in a respective oscillation of the bell crank levers and the links, without affecting the even rotation and transmission of the power from one axle to the other.

The driving wheel 25 is a hollow cast steel wheel in which the movable coupling is arranged. The shafts 10 and 21 with right angle worm gears and coupling are enclosed in a casing 39 rigidly connected to the locomotive frame and in the wheel 25 which is made hollow as shown.

To distribute the power of the oil engine to a large number of worm gears the shafts 10, worm gears 32 and couplings are symmetrically arranged on both sides of the high power locomotive.

The described coupling can be replaced by any other kind of single axle drive coupling, similar to those used in electric locomotives.

The frame of the locomotive is a cast steel casing integral with the crank case 41 of the oil engine, while the casing 42 of the pump and of the motor of the transmission consists of different parts bolted together. The cast steel frame contains the bearings and supports of the crankshaft of the oil engine, of the rotors of the transmission, of the longitudinal shafts and the guides of the bearings of the driving axles etc.

At each end of the locomotive are four wheel trucks 43 and 44, and between them are arranged six driving axles.

In Figure 5 I have shown a second constructional example. The locomotive has the same driving gear as the first example, longitudinal side shafts 110 and 111, driven from the rotor 112 of the pump 102 of the hydromechanical transmission and individually drives, worm gears and couplings.

This locomotive differs from the first one by the arrangement of the hydromechanical transmission in the middle of the locomotive, accomplished by arranging the motor 103 of the transmission above the pump 102. This makes it possible to drive the pump 102 of the transmission by two oil engines 101. This arrangement shortens the length of the locomotive and gives the simplest design of the hydraulic transmission with piping 104.

The driving gear in this locomotive is more advantageous, as the longitudinal side shafts 110 and 111 become shorter and drive to both sides of the transmission. The weight distribution is more favorable as the main weights are concentrated at the middle of the locomotive.

The arrangement of Figure 5 gives a fully symmetrical locomotive having the same running qualities in both directions.

Toothed rims 115 of the rotor 113 of the motor 103 mesh with toothed rims 114 of the pump rotor 112, and the latter meshes with spur gear 116 of the side shafts 110 and 111.

In Figs. 6 and 7 is diagrammatically illustrated a single drive in which the worm gears are replaced by (bevel) gears. Longitudinal shaft 50 is driven by spur gear 52 through an intermediate shaft 51. Gear wheel 53 meshes with the toothed rim 54 of the transmission 55. On shaft 50 is mounted the bevel wheel 60 which meshes with bevel wheel 61 mounted on shaft 66.

The shaft 66 is mounted in roller bearings 63 in casing 64 rigidly connected to the frame 80. Bevel wheel 61 drives the locomotive wheel 67 on the hollow driving axle 77 in the same manner as the worm gear drive in Fig. 2 by means of coupling 65.

The described arrangement of prime mover, transmission and driving gears utilizes fully the space inside of the driving axles and wheels, frame and cab leaving free space all around for walks to watch and operate the engines.

The new design avoids the large rod forces of the standard crank drive of locomotives and the longitudinal stresses in the frame, resulting in lighter frame and driving axles, and avoids the use of counter weights.

Worm gears, driving wheels, shafts and movable couplings are alike for all axles, and the same type and size can be applied to various locomotives of different power and speed, the only difference being in the number of the driving axles and the ratio of the gears.

I claim:

1. A locomotive comprising in combination a prime mover, a longitudinal shaft, a driving axle, right angle gears, and a movable coupling arranged between the longitudinal shaft and driving axle, said driving axle comprising a hollow shaft 22 rigidly connected with the driving wheel, mounted in bearings 23 which are connected with the locomotive frame 20 by springs 24, a second shaft 21 mounted in bearings 33 rigidly connected with the frame 20, carrying the right angle gear 32, said shaft 21 arranged inside of the hollow shaft and extending therethrough with clearance, said both shafts connected together by the movable coupling.

2. In a locomotive comprising a prime mover, a longitudinal shaft, a driving axle, right angle gears, and a movable coupling arranged between said longitudinal shaft and driving axle, a driving wheel 25 on the driving axle, shaped as a hollow wheel, inside of which said movable coupling is arranged and enclosed.

3. A locomotive comprising in combination a prime mover, a longitudinal shaft, a hollow driving axle, a shaft 21 therein, right angle gears consisting of a worm on the longitudinal shaft and a worm gear meshing therewith and a movable coupling arranged between said longitudinal shaft and driving axle, there being a driving wheel 25 on the driving axle and the worm wheel being mounted on the shaft 21 with the movable coupling connecting the driving wheel and worm gear.

4. In a locomotive comprising in combination a prime mover, a longitudinal shaft, a driving axle, a shaft 21 therein, a driving wheel on the driving axle, right angle gears consisting of a worm on the longitudinal shaft and a worm wheel meshing therewith, the latter being mounted on shaft 21, and a movable coupling arranged between said longitudinal shaft and driving axle, the said movable coupling comprising four pins 34, 35, two of them carried on the worm wheel and two carried on the driving wheel, two bellcrank levers 36, and links 37.

5. A locomotive comprising in combination a prime mover, a longitudinal shaft, a driving axle, a driving wheel thereon, right angle gears and a movable coupling arranged between said longitudinal shaft and driving axle, said driving axle comprising a hollow shaft mounted in bearings connected to the frame by springs, a shaft mounted in bearings rigidly connected to the frame, carrying the right angle gear and said shaft arranged inside of the hollow shaft and extending therethrough with clearance, said both shafts being connected together by a movable coupling, said coupling comprising four pins, two carried on the gear on the rigidly mounted shaft and two carried on the driving wheel, two bellcrank levers and three links.

6. A locomotive comprising in combination a prime mover, a longitudinal shaft, a driving axle, right angle gears and a movable coupling arranged between said longitudinal shaft and driving axle, and a hydromechanical transmission arranged between the prime mover and longitudinal shaft, comprising a pump and a motor, a rotor in each of them, the rotor of the motor arranged upon the pump; toothrims on said rotors and geared together and toothrims of the pumprotor meshed with the gear on the longitudinal shaft.

7. A locomotive comprising in combination two prime movers, a longitudinal shaft, a driving axle, right angle gears and a movable coupling arranged between said longitudinal shaft and driving axle, and a hydromechanical transmission arranged between the prime mover and the longitudinal shaft comprising a pump and a motor, a rotor in each of them, the pump arranged below the motor, and gears between the rotors and the longitudinal shaft, one prime mover arranged on each side of the pump and driving the pump.

8. A locomotive comprising in combination a prime mover, a longitudinal shaft, a driving axle, right angle gears and a movable coupling arranged between said longitudinal shaft and driving axle, said driving axle comprising a shaft mounted on bearings connected to the frame by springs, a shaft mounted in bearings rigidly connected to the frame, said both shafts connected together by said movable coupling, said coupling being a link coupling, and a hydromechanical transmission arranged between the prime mover and longitudinal shaft, comprising a pump and a motor, a rotor in each of them, the motor arranged upon said pump, and gears between said rotors and the longitudinal shaft.

9. A locomotive comprising in combination an internal combustion engine, a longitudinal shaft, driving axles below the same, wormgears arranged between said longitudinal shaft and driving axles, a movable link coupling arranged between each worm gear and driving axle, and a variable speed transmission arranged between said internal combustion engine and said longitudinal shaft.

10. In a locomotive the combination of a frame, a driving axle extending cross-wise therebeneath, driving wheels mounted on the ends of said axle, a housing rigid with the frame disposed alongside at least one of said driving wheels, right angle driving gears in the housing, one of said gears being supported in a bearing in said housing substantially concentric with and alongside the driving wheel, a longitudinal shaft rigidly supported on said frame having the other of the right angle gears carried thereon, a prime mover on the frame for driving the longitudinal shaft, and a coupling providing a driving connection between the driving wheel and the gear disposed alongside the same, said coupling permitting radial displacement of the driving wheel with reference to said gear.

11. A structure as set forth in claim 10 wherein the driving wheel is formed so as to enclose the coupling between the wheel and housing.

12. A locomotive comprising in combination a frame, a plurality of hollow driving axles disposed crosswise beneath the frame parallel to one another, driving wheels on the opposite ends of said axles, springs supporting the frame on said axles, housing means disposed alongside the driving wheels at opposite sides of the frame and rigidly supported by the frame, longitudinal drive shafts in the housings at opposite sides of the frame, a prime mover on the frame having driving connections with said shafts, crossshafts extending through the hollow axles, the axles providing clearance therein for the shafts to permit radial displacement of the axles relative to the shafts, the cross-shafts being received in bearings at the opposite ends thereof in the housings, right angle gears providing driving connections for each of the shafts with the longitudinal shafts, each of said shafts having one of the right angle gears mounted on the end thereof alongside the driving wheel, the other of the right angle gears meshing therewith being mounted on the longitudinal shaft, and couplings between the gears on the cross-shafts for the drive wheels permitting displacement of the drive wheels relative to the gears.

13. A structure as set forth in claim 12 wherein the drive wheels are formed so as to enclose the couplings between the wheels and the housing.

Beloit, Wis., U. S. A., Oct. 17, 1927.

HEINRICH SCHNEIDER.